A. A. PRATT.
VEHICLE MOUNTING.
APPLICATION FILED OCT. 12, 1911. RENEWED SEPT. 6, 1912.
1,057,979.
Patented Apr. 1, 1913.
2 SHEETS—SHEET 1.
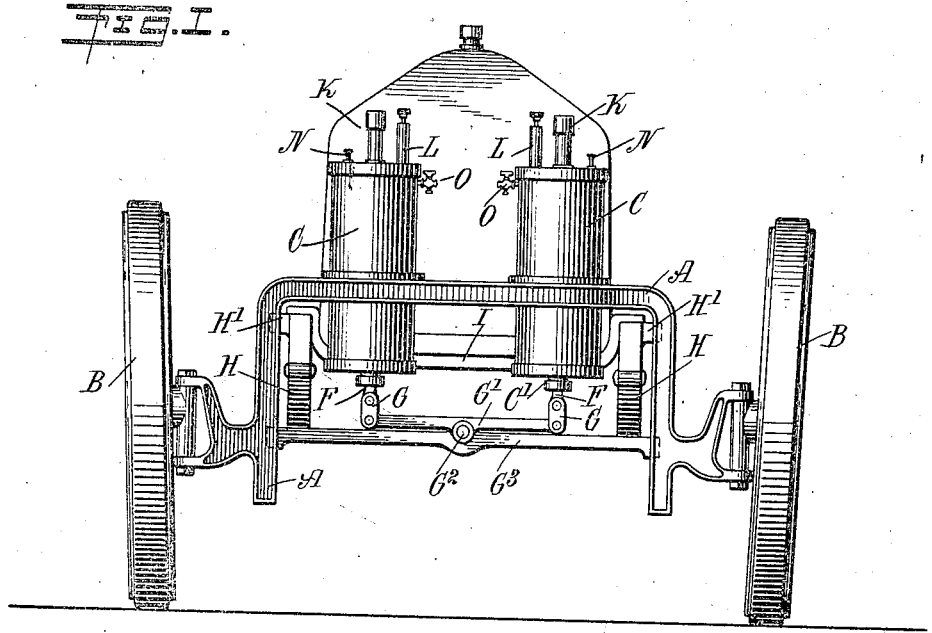
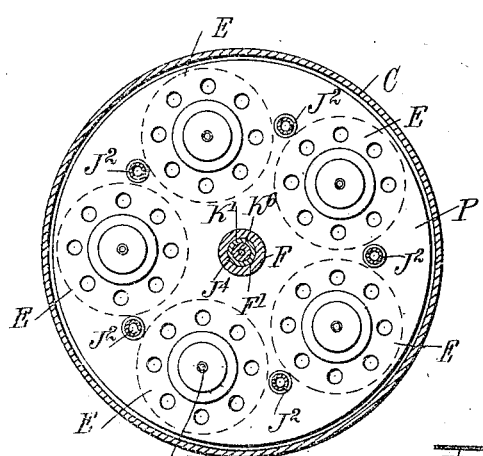
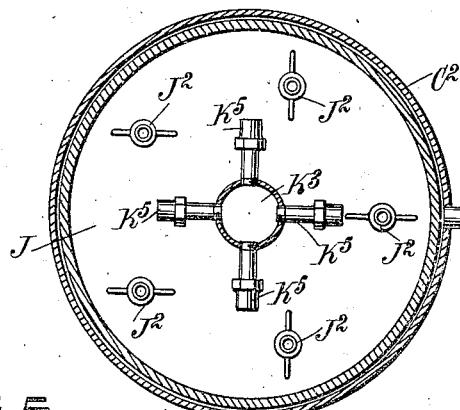
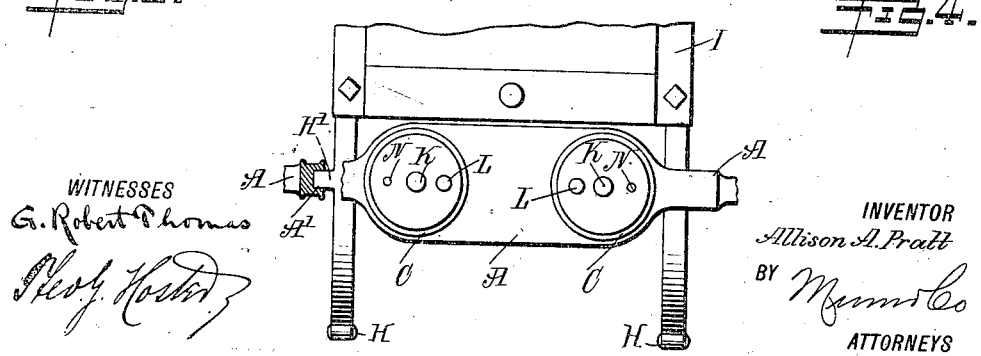
WITNESSES
G. Robert Thomas
Geo. J. Hosler
INVENTOR
Allison A. Pratt
BY Munn & Co
ATTORNEYS

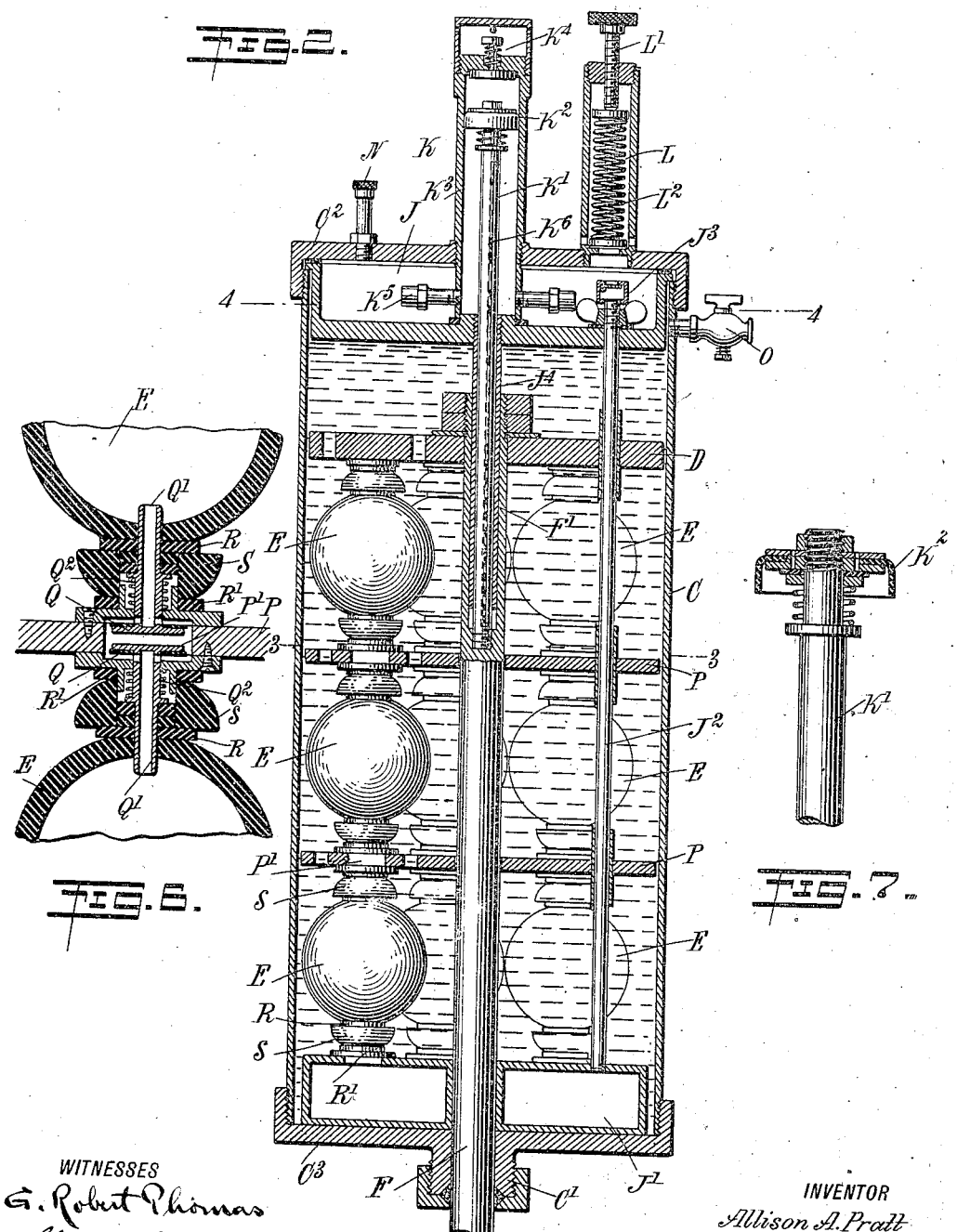

UNITED STATES PATENT OFFICE.

ALLISON A. PRATT, OF NEW YORK, N. Y.

VEHICLE-MOUNTING.

1,057,979.  Specification of Letters Patent.  Patented Apr. 1, 1913.

Application filed October 12, 1911, Serial No. 654,205. Renewed September 6, 1912. Serial No. 719,008.

*To all whom it may concern:*

Be it known that I, ALLISON A. PRATT, a citizen of the United States, and a resident of the city of New York, borough of Manhattan, in the county and State of New York, have invented a new and Improved Vehicle-Mounting, of which the following is a full, clear, and exact description.

The invention relates to automobiles and like vehicles, and its object is to provide a new and improved vehicle mounting or suspension, arranged to insure easy and comfortable riding in the vehicle without requiring the use of pneumatic or similar tires, thus reducing tire expense to a minimum and eliminating danger and delay caused by bursting tires and the like. For the purpose mentioned, use is made of pneumatic devices interposed between the axle and the vehicle body, each pneumatic device consisting of a casing containing a series of inflatable hollow balls connected with a pressure chamber and containing a presser plate connected with the vehicle body.

A practical embodiment of the invention is represented in the accompanying drawings forming a part of this specification, in which similar characters of reference indicate corresponding parts in all the views.

Figure 1 is a front elevation of the improvement as applied to an automobile; Fig. 2 is an enlarged vertical central section of one of the pneumatic devices; Fig. 3 is a sectional plan view of the same on the line 3—3 of Fig. 2; Fig. 4 is a similar view of the same on the line 4—4 of Fig. 2; Fig. 5 is a plan view of the improvement as applied to an automobile, part of the front wheel being in section; Fig. 6 is an enlarged central section of part of the pneumatic device showing adjacent hollow balls; and Fig. 7 is an enlarged sectional side elevation of the pump plunger.

As shown in Figs. 1 and 5, the front axle A of the automobile or other vehicle carries the front or steering wheels B and the said axle is made in inverted U shape with the top portion widened to support one, two or more pneumatic pressure devices, each having a casing C fixedly attached to the top of the axle A by any suitable means. Within the casing C is movably arranged a presser plate D supported at its under side by sets of vertically-disposed hollow balls E, made of rubber or other suitable flexible material, and the said presser plate D is provided with a presser rod F extending through a stuffing box C' held on the bottom of the casing C. The lower ends of the two presser rods F of the two pneumatic pressure devices shown in Figs. 1 and 5 are connected by links G with a transversely-extending lever G' pivotally connected at its middle at $G^2$ to the middle of a beam $G^3$ mounted to slide at its ends in suitable guideways A' arranged on the side arms of the front axle A. The beam $G^3$ supports the front axle springs H of the usual form, and is provided with lugs H' engaging the guideways A' in the axle A, and the said leaf springs H support the chassis or frame I of the vehicle body, it being understood that a similar arrangement is made on the rear axle of the vehicle so as to support the rear end of the frame I of the vehicle body in a like manner. In the top of the casing C is arranged an air pressure chamber J, and a similar air pressure chamber J' is arranged in the bottom of the said casing, and the said upper and lower air pressure chambers J and J' are connected with each other by pipes $J^2$ provided at their upper ends with check valves $J^3$ to allow the flow of air from the chamber J by way of the pipes $J^2$ into the chamber J' but to prevent return flow of air from the chamber J' by way of the pipes $J^2$ into the chamber J. The lower chamber J' is in communication with the sets of balls E so as to maintain an air pressure within the said balls corresponding to that in the chamber J', and air is pumped into the upper chamber J by means of an air pump K controlled by the movement of the presser plate rod F which for this purpose is provided at its upper end with a pump rod K' carrying a valved plunger $K^2$ mounted to reciprocate in a cylinder $K^3$ extending into the upper air pressure chamber J and supported on the top cap $C^2$ of the casing C, which top cap $C^2$ also forms the top for the upper air pressure chamber J. The lower cap $C^3$ of the casing C supports the lower pressure chamber J' and also carries the stuffing box C′ previously mentioned. The upper end of the pump cylinder K³ is provided with an air inlet valve K⁴, and the lower end of the cylinder K³ is provided within the air pressure chamber J with valved outlets K⁵ discharging into the said air pressure chamber J.

It is understood that when the device is in use and the casing C and the presser plate D and its rod F move down and up one relative to the other, then the plunger K² moves likewise up and down relative to the cylinder K³ so that air is drawn into the cylinder K³ by way of the valve K⁴ and discharged into the air chamber J by way of the valved outlets K⁵ to maintain a uniform pressure in the chamber J and consequently in the chamber J′ and the hollow balls E.

The bottom of the upper pressure chamber J is provided with a depending hollow plunger J⁴ extending downwardly into the upper hollow end F′ of the presser plate rod F, and which hollow end F′ forms the cylinder for the plunger J⁴ to work in on the up and down movement of the presser plate D. The plunger rod K′ of the pump K is provided with a channel K⁶ extending lengthwise and opening at its lower end into the hollow end F′ of the presser plate rod F and opening at its upper end into the cylinder K³, so that a uniform pressure is maintained in the cylinder K³ and the cylinder formed by the upper hollow end F′ of the presser plate rod F.

The cap C² and consequently the chamber J is provided with a relief valve L, preferably of the spring type, and provided with an adjusting screw L′ for regulating the tension of the spring L² of the said valve L with a view to set the relief valve L to the normal pressure in the air pressure chamber J, and consequently when the air pressure in the chamber J reaches the pressure to which the relief valve L is set then the latter opens and allows the excessive pressure to pass to the atmosphere. The cap C² is provided with a filling valve N, of any approved construction, to permit of charging the chamber J originally with air until the desired normal pressure is obtained.

The casing C is preferably filled with a non-freezing liquid, such as glycerin, and any air that may pass into the casing C may be drawn off by way of a suitable valve O, as indicated in Fig. 2.

As shown in Fig. 2, three balls E located one above the other belong to each set of balls in the casing C, the lowermost ball E being in communication with the lowermost air pressure chamber J′, and the uppermost ball being adjacent to the under side of the presser plate D. By the arrangement described tiers of balls E are provided, and between the said tiers of balls E are arranged separating plates P guided on the tubes J² and through which passes loosely the presser plate rod F. Each plate P is provided with valve chambers P′, one for each pair of balls E in a set, and belonging to the tier above and below the corresponding plate P, as will be readily understood by reference to Figs. 2 and 6. In each of the valve chambers P′ are arranged two valves Q having hollow stems Q′ extending into the corresponding balls E, and the said stems Q′ are pressed on by springs Q² to allow the valve Q to close immediately in case the corresponding ball E breaks or bursts, so that this ball is cut out of the set of balls and the others are not deflated. On each valve stem Q′ adjacent to a ball E is arranged a washer R, and a similar washer R′ is arranged on the top or bottom of the valve chamber P′, and between a pair of washers R and R′ is located a bumper S, made preferably of rubber, similar to the washers R and R′ and the ball E. The portion of the bumper S adjacent to the washer R′ is curved, as plainly indicated in Fig. 6, so that when the balls E are subjected to pressure in a downward direction by the presser plate D then a portion of the pressure is taken up by the bumpers S and the latter prevent a short bend in the walls of the balls E owing to the curvature given to the bumpers S. The presser plate D as well as the plates P are preferably perforated adjacent the balls E so that the said plates can readily pass up and down in the liquid with which the casing C is filled.

The operation is as follows: The balls E are normally inflated with a pressure sufficient to hold the balls E inflated against the weight of the vehicle body, and when any one of the wheels B passes over an obstruction in the roadway, then the shock is taken up by the balls E owing to the compressibility thereof, and hence the shock is not transmitted by the presser plate D, rod F and connections to the vehicle body of the automobile. It is further understood that most of the shock is absorbed by the cushioning device nearest the wheel passing over the obstruction at the time, but owing to the connection between the presser plate rods of the two cushioning devices both cushioning devices are rendered active at a time, one, however, more than the other, unless both wheels are subjected at the same time to shock by passing over similar obstructions. Thus when the vehicle travels on rough roads the shock is readily taken up by the cushioning devices and hence an easy riding in the vehicle is insured.

By the use of the cushioning devices referred to, the wheels B may be provided with ordinary tires instead of the inflatable or pneumatic tires now generally used, and hence tire expense is reduced to a minimum, and at the same time all danger and delay caused by bursting tires is eliminated.

It is understood that when a vehicle wheel passes over an obstruction, the axle and the casings C thereon rise with the axle while the presser plate D and the vehicle body are partially not affected and hence an easy riding is insured.

Having thus described my invention, I claim as new and desire to secure by Letters Patent:

1. A cushioning device for vehicles, comprising a casing for attachment to an axle of the vehicle, a liquid filling the said casing, a series of hollow compressible balls submerged in the said liquid, and a presser plate movable in the said casing and adapted to support the body of the vehicle, the said balls being pressed by the said presser plate.

2. A cushioning device for vehicles, comprising a casing for attachment to an axle of the vehicle, a liquid filling the said casing, a series of hollow compressible balls submerged in the said liquid, a presser plate movable in the said casing and adapted to support the body of the vehicle, the said balls being pressed by the said presser plate, and an air pressure chamber connected with the said balls.

3. A cushioning device for vehicles having casings attached to the axles of the vehicle, presser plates in the said casings and provided with rods extending to the outside of the casings, a connecting lever connecting the presser plate rods with each other, a beam connected with the said connecting lever, springs on the said beam and adapted to support the chassis of the vehicle, a series of inflatable balls within each casing and adapted to be pressed by the said presser plate, and an air pressure chamber in each casing and in communication with the interior of the said balls.

4. A cushioning device for vehicles, comprising a casing adapted to rest on an axle of the vehicle and provided with a pressure chamber, series of hollow compressible balls within the casing and in communication with the said pressure chamber, and a presser plate in the casing and engaging the series of balls, the presser plate being adapted to support the body of the vehicle.

5. A cushioning device for vehicles, comprising a casing adapted to rest on an axle of the vehicle and provided with a pressure chamber, a series of hollow compressible balls within the said casing and in communication with the said pressure chamber, a presser plate in the casing and engaging the series of balls, the presser plate being adapted to support the body of the vehicle, and an air pump controlled by the said presser plate for pumping air into the said pressure chamber.

6. A cushioning device for vehicles, comprising a casing adapted to rest on an axle of the vehicle and provided with a pressure chamber, a liquid filling the said chamber, a series of hollow compressible balls within the casing and submerged in the said liquid, the said compressible balls having a valved connection with each other and being in connection with the said pressure chamber, a presser plate in the casing and engaging the series of balls, the presser plate being adapted to support the body of the vehicle, an air pump controlled by the said presser plate for pumping air into the said pressure chamber, and a relief valve on the pressure chamber to relieve the pressure chamber of excessive pressure.

7. A cushioning device for vehicles, comprising casings attached to the axles of the vehicle, presser plates in the said casings and provided with rods extending to the outside of the casings, a connecting lever connecting the presser plate rods with each other, a beam connected with the said connecting lever, springs on the said beam and adapted to support the chassis of the vehicle, a series of inflatable balls within each casing and adapted to be pressed by the said presser plate, an air pressure chamber in each casing and in communication with the interior of the said balls, and an air pump on each casing and controlled by the said presser plate, the air pump discharging into the said air pressure chamber.

8. A cushioning device for vehicles, comprising a casing for attachment to an axle of the vehicle, an air pressure chamber in the said casing, a presser plate movable in the said casing and having a presser rod connected with the vehicle body to sustain the load, and series of hollow flexible balls in the casing interposed between the said air pressure chamber and the said presser plate, the said flexible balls being in communication one with the other and with the said air pressure chamber.

9. A cushioning device for vehicles interposed between the axle and the vehicle body, comprising a casing attached to an axle, pressure chambers in the top and bottom of the casing, pipes connecting the said chambers with each other, a presser plate movable in the said casing intermediate the said pressure chambers and having a rod extending to the outside of the casing and connected with the vehicle body, a plurality of sets of hollow flexible balls interposed between the said presser plate and the lower air pressure chamber, the balls in a set being in communication one with the other and the lowermost ball in each set being in communication with the said lower air pressure chamber.

10. A cushioning device for vehicles interposed between an axle and the vehicle body, comprising a casing attached to an axle, pressure chambers in the top and bottom of the casing, pipes connecting the said chambers with each other, a presser plate movable in the said casing intermediate the said pressure chambers and having a rod extending to the outside of the casing and connected with the vehicle body, a plurality of sets of hollow flexible balls interposed between the said presser plate and the lower air pressure chamber, the lowermost ball in each set being in communication with the said lower air pressure chamber, supporting plates intermediate successive balls in each set, cushioning washers at the top and bottom of each ball, and spring-pressed valves for the top and bottom of each ball and normally open, the upper balls being without valves at the top.

11. A cushioning device for vehicles interposed between an axle and the vehicle body, comprising a casing attached to an axle, pressure chambers in the top and bottom of the casing, pipes connecting the said chambers with each other, a presser plate movable in the said casing intermediate the said pressure chambers and having a rod extending to the outside of the casing and connected with the vehicle body, a plurality of sets of hollow flexible balls interposed between the said presser plate and the lower air pressure chamber, the balls in a set being in communication one with the other, and the lowermost ball in each set being in communication with the said lower air pressure chamber, a pump cylinder on the uppermost air pressure chamber and extending to the outside of the casing, an air inlet valve at the outer end of the said pump cylinder, valved outlets leading from the lower end of the said pump cylinder into the said uppermost air pressure chamber, a valved plunger in the said pump cylinder, and a plunger rod on the said plunger and attached to the said presser plate rod.

12. A cushioning device for vehicles interposed between an axle and the vehicle body, comprising a casing attached to an axle, pressure chambers in the top and bottom of the casing, pipes connecting the said chambers with each other, a presser plate movable in the said casing intermediate the said pressure chambers and having a rod extending to the outside of the casing and connected with the vehicle body, a plurality of sets of hollow flexible balls interposed between the said presser plate and the lower air pressure chamber, the balls in a set being in communication one with the other and the lowermost ball in each set being in communication with the said lower air pressure chamber, a pump cylinder on the uppermost air pressure chamber and extending to the outside of the casing, an air inlet valve at the outer end of the said pump cylinder, valved outlets leading from the lower end of the said pump cylinder into the said uppermost air pressure chamber, a valved plunger in the said pump cylinder, a plunger rod on the said plunger and attached to the said presser plate rod, and a hollow plunger held on the said upper air pressure chamber and extending into a cylinder formed in the upper end of the said presser plate rod, the said plunger rod having a lengthwise-extending channel opening at one end into the said pump cylinder and at the other end into the said presser rod cylinder.

13. A cushioning device for vehicles, comprising a casing for attachment to an axle of the vehicle, an air pressure chamber in the said casing, a presser plate movable in the said casing and having a presser rod connected with the vehicle body to sustain the load, series of hollow flexible balls in the casing interposed between the said air pressure chamber and the said presser plate, the said flexible balls being in communication one with the other and with the said air pressure chamber, and self-closing valves normally open for the passage of the air pressure to and from the said balls.

14. A cushioning device for vehicles, comprising a casing for attachment to an axle of the vehicle, an air pressure chamber in the said casing, a presser plate movable in the said casing and having a presser rod connected with the vehicle body to sustain the load, series of hollow flexible balls in the casing interposed between the said air pressure chamber and the said presser plate, the said flexible balls being in communication one with the other and with the said air pressure chamber, valves for the said balls, and springs for closing the valves on the breaking of the balls.

15. A cushioning device for vehicles interposed between an axle and the vehicle body, comprising a casing, a presser plate movable therein and provided with a presser rod having a cylinder at one end, pressure chambers in the casing, cushioning devices intermediate the presser plate and one of the pressure chambers, an air pump for pumping air into the said air chambers and having its plunger rod attached to the said presser rod, the said plunger rod having an equalizing channel, and a hollow plunger held on one of the said air pressure chambers and slidingly engaging the cylindrical end of the presser plate rod.

16. A cushioning device for vehicles interposed between the axle and the vehicle body, comprising a casing attached to an axle, pressure chambers in the top and bottom of the casing, pipes connecting the said chambers with each other, check valves in the said connecting pipes, a presser plate movable in the said casing intermediate the said pressure chambers and having a rod extending to the outside of the casing and connected with the vehicle body, a plurality of sets of hollow flexible balls interposed between the said presser plate and the lower air pressure chamber, the balls in a set being in communication one with the other and the lowermost ball in each set being in communication with the said lower air pressure chamber.

In testimony whereof I have signed my name to this specification in the presence of two subscribing witnesses.

ALLISON A. PRATT.

Witnesses:
 THEO. G. HOSTER,
 PHILIP D. ROLLHAUS.